(12) United States Patent
Syrowitz et al.

(10) Patent No.: US 10,516,638 B2
(45) Date of Patent: Dec. 24, 2019

(54) TECHNIQUES TO SELECT AND PRIORITIZE APPLICATION OF JUNK EMAIL FILTERING RULES

(71) Applicant: MICROSOFT TECHNOLOGY LICENSING, LLC, Redmond, WA (US)

(72) Inventors: Clinton Syrowitz, Bellevue, WA (US); Mauktik Gandhi, Redmond, WA (US); Ashish Mishra, Seattle, WA (US); Manivannan Sundaram, Bothell, WA (US); Terence Zink, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 104 days.

(21) Appl. No.: 15/835,627

(22) Filed: Dec. 8, 2017

(65) Prior Publication Data
US 2018/0109480 A1 Apr. 19, 2018

Related U.S. Application Data

(63) Continuation of application No. 13/538,963, filed on Jun. 29, 2012, now Pat. No. 9,876,742.

(51) Int. Cl.
| | | |
|---|---|---|
| G06Q 10/10 | (2012.01) | |
| G06F 17/30 | (2006.01) | |
| G06F 15/173 | (2006.01) | |
| H04L 12/58 | (2006.01) | |

(52) U.S. Cl.
CPC ........... *H04L 51/12* (2013.01); *G06Q 10/107* (2013.01)

(58) Field of Classification Search
CPC .................................. G06F 7/00; H04L 51/12
See application file for complete search history.

(56) References Cited

U.S. PATENT DOCUMENTS

| | | | | |
|---|---|---|---|---|
| 6,654,787 | B1 * | 11/2003 | Aronson | H04L 51/12 707/999.003 |
| 7,644,127 | B2 * | 1/2010 | Yu | H04L 51/12 709/206 |
| 8,775,341 | B1 * | 7/2014 | Commons | G06N 3/0454 706/20 |
| 2004/0215977 | A1 * | 10/2004 | Goodman | G06Q 10/107 726/22 |

(Continued)

*Primary Examiner* — Kevin T Bates
*Assistant Examiner* — Mark A Scott
(74) *Attorney, Agent, or Firm* — NovoTechIP International PLLC

(57) ABSTRACT

Techniques to select and prioritize the application of spam filtering rules in a way that reduces processing time may include receiving an email message for a recipient at a spam filter and extracting email characteristics from the message. Global filtering rule statistics and a profile for the recipient may be retrieved. The technique may include selecting a subset of rules from a set of filtering rules according to the email characteristics, the global filtering rule statistics, and/or the recipient characteristics. The subset of rules may be prioritized and applied to the message from highest priority to lowest until a determination of whether the message is spam is reached. Other embodiments are described and claimed.

20 Claims, 11 Drawing Sheets

(56) References Cited

U.S. PATENT DOCUMENTS

| | | | |
|---|---|---|---|
| 2006/0010217 A1* | 1/2006 | Sood | H04L 51/12 709/206 |
| 2006/0149821 A1* | 7/2006 | Rajan | G06Q 10/107 709/206 |
| 2007/0038705 A1* | 2/2007 | Chickering | H04L 51/12 709/206 |
| 2007/0083929 A1* | 4/2007 | Sprosts | G06Q 10/107 726/22 |
| 2007/0185963 A1* | 8/2007 | Stauffer | G06Q 10/107 709/207 |
| 2009/0006569 A1* | 1/2009 | Morss | H04L 12/585 709/206 |
| 2009/0100138 A1* | 4/2009 | Harris | G06Q 10/107 709/206 |
| 2009/0276208 A1* | 11/2009 | Pagan | G06F 17/274 704/9 |
| 2010/0017476 A1* | 1/2010 | Shue | G06Q 10/107 709/206 |
| 2010/0235915 A1* | 9/2010 | Memon | H04L 63/145 726/23 |
| 2010/0325633 A1* | 12/2010 | Eguro | G06F 9/4881 718/103 |
| 2011/0246584 A1* | 10/2011 | Vitaldevara | H04L 51/12 709/206 |
| 2012/0254333 A1* | 10/2012 | Chandramouli | G06F 17/27 709/206 |
| 2012/0303624 A1* | 11/2012 | Gandhi | G06F 17/2785 707/740 |
| 2013/0325991 A1* | 12/2013 | Chambers | H04L 51/12 709/206 |
| 2013/0333028 A1* | 12/2013 | Hagar | H04L 63/0236 726/22 |

\* cited by examiner

800

- RECEIVE EMAIL MESSAGE FOR A RECIPIENT AT A SPAM FILTER
  *802*

- EXTRACT EMAIL CHARACTERISTICS FROM THE MESSAGE
  *804*

- RETRIEVE GLOBAL FILTERING RULE STATISTICS
  *806*

- RETRIEVE RECIPIENT PROFILE
  *808*

- SELECT A SUBSET OF FILTERING RULES ACCORDING TO THE EMAIL CHARACTERISTICS, GLOBAL FILTERING RULE STATISTICS, AND/OR RECIPIENT PROFILE
  *810*

- PRIORITIZE THE SUBSET OF RULES
  *812*

- APPLY THE PRIORITIZED SUBSET OF RULES FROM HIGHEST PRIORITY TO LOWEST UNTIL A DETERMINATION OF WHETHER MESSAGE IS SPAM IS REACHED
  *814*

*FIG. 8*

TECHNIQUES TO SELECT AND PRIORITIZE APPLICATION OF JUNK EMAIL FILTERING RULES

CROSS-REFERENCE TO RELATED APPLICATION

This application is a continuation of, claims the benefit of and priority to, previously filed U.S. patent application Ser. No. 13/538,963 entitled "TECHNIQUES TO SELECT AND PRIORITIZE APPLICATION OF JUNK EMAIL FILTERING RULES" filed on Jun. 29, 2012, the subject matter of which is hereby incorporated herein by reference in its respective entirety.

BACKGROUND

Most electronic mail (email) providers provide a filtering service to remove or flag junk email, known as spam, from a user's mailbox. Email providers establish filtering rules that evaluate regular expressions in a message to identify one or more characteristics of spam. For example, rules may look for names of pharmaceutical products, sexual content, or gibberish in the body of an email message, and may remove messages that contain such content. The number of rules needed to identify spam grows as spam senders try to work around established rules. Evaluating every rule against a message therefore uses more time and processing resources as the number of rules grows. Evaluating every rule against a message is also inefficient, as not all rules will be applicable to a given message. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to select and prioritize the application of junk email (spam) filtering rules. Some embodiments are particularly directed to techniques to select and prioritize the application of spam filtering rules in a way that reduces processing time. In one embodiment, for example, a technique may comprise receiving an email message for a recipient at a spam filter and extracting email characteristics from the message. Global filtering rule statistics and a profile for the recipient may be retrieved. The technique may include selecting a subset of rules from a set of filtering rules according to the email characteristics, the global filtering rule statistics, and/or the recipient characteristics. The subset of rules may be prioritized and applied to the message from highest priority to lowest until a determination of whether the message is spam is reached. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 8 illustrates an embodiment of a logic flow for the system of FIG. 1.

DETAILED DESCRIPTION

Figure 1:
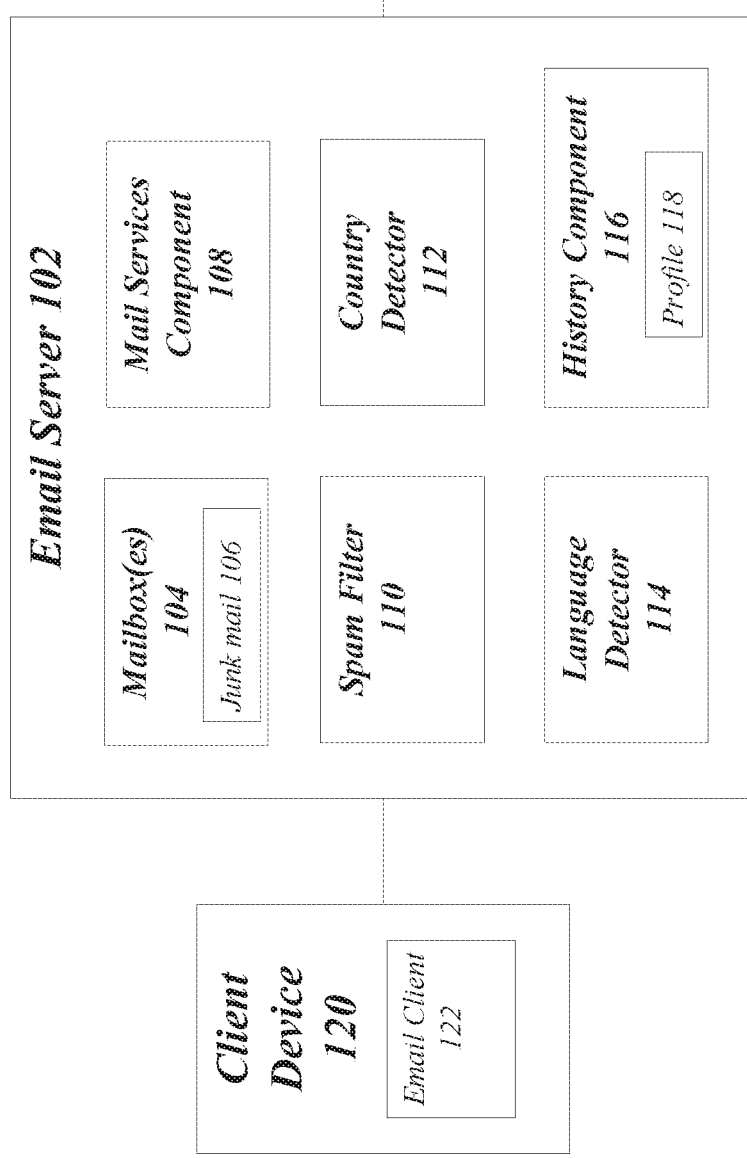
FIG. 1 illustrates an embodiment of a system to select and prioritize the application of spam filtering rules to email messages.

Various embodiments are directed to techniques to select and prioritize the application of spam filtering rules to email messages, making the detection of junk email more efficient. Various embodiments may use characteristics of the email message, global filtering rule statistics, and/or information about the recipient's email-related behavior to select which filtering rules may be relevant to the email message. The selected rules may be prioritized such that the most useful, efficient, and/or relevant rules are applied first. In this manner, a determination of whether the message is spam may be reached more quickly and efficiently. As a result, the embodiments can improve affordability, scalability, modularity, extendibility, or interoperability for an operator, device or network.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for a specific purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the needed method steps. The needed structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may include an email server 102 and one or more client devices, such as client device 120. Although the system 100 shown in FIG. 1 has a limited number of elements in a certain topology, it may be appreciated that the system 100 may include more or less elements in alternate topologies as desired for a given implementation.

System 100 may include an email server 102. Email server 102 may represent one or more electronic devices that provide and host email services for multiple clients. Email server 102 may be implemented as one or more on-premises electronic devices, for example, for a business location. Email server 102 may be implemented as a remote or "cloud" deployment accessible over a network, such as the Internet. Email server 102 may be arranged to provide email services such as, but not limited to, receiving email messages for an email account, sending email messages from an email account, storing email messages, and providing filtering services, such as spam filtering.

In an embodiment, email server 102 may include various functional components, such as a mail services component 108, a spam filter 110, a country detector 112 and a language detector 114. Email server 102 may include alternate, fewer or additional components to provide the functionality described herein. In various embodiments, some components may be combined into one component. The embodiments are not limited to these examples.

Email server 102 may store email messages, e.g. incoming email 130, in mailboxes 104. Each email account may have its own mailbox 104. A mailbox 104 may represent the logical storage for all email messages of one account. A mailbox 104 may have sub-mailboxes, such as an inbox, a sent mail box, a deleted items box, a junk mail box 106, and user-defined boxes. A mailbox 104 may store all messages for an email account until a user chooses to delete the messages from email server 102.

Email server 102 may include mail services component 108. Mail services component 108 may operate to provide the email management services provided by email server 102. Such functional components may, for example, identify an intended recipient, process and apply mail rules created by a recipient, synchronize with mobile or remote clients, and so forth.

Email server 102 may include spam filter 110. Spam filter 110 may provide operations to examine received emails to determine whether the email is welcomed or unwelcomed, unsolicited email, e.g. spam. In various embodiments, spam filter 110 may examine, in particular, characteristics of a received email and of a recipient profile, as well as global filtering rule statistics, to make a spam determination. Spam filter 110 is described further with respect to FIG. 2.

Email server 102 may include country detector 112. Country detector 112 may provide operations to examine a received email, such as email 130, and determine the country from which the email was sent. For example, country detector 112 may use the Internet protocol (IP) address 132 in the email and identify the country to which the IP address was allocated. Country detector 112 may provide the identified country to spam filter 110 and/or to history component 116, as will be discussed.

Email server 102 may include language detector 114. Language detector 114 may detect the language, or languages, in which an email is written. Language detection may be performed by examining the character set used by the email message, for example, as included in the multi-purpose internet mail extensions (MIME) content. However, some character sets are common to many, if not all, languages and this method may not be robust in distinguishing, for example, German and Dutch, or Portuguese and Spanish. Language detector 114 may examine the actual content 134, e.g. the body or text, in an email message 130 and use language detection techniques to identify the language or languages used. Language detector 114 may provide the identified language(s) to spam filter 110 and/or to history component 116, as will be discussed.

Email server 102 may include history component 116. History component 116 may track the behavior of an email account and store data about the behavior in a profile 118 for the email account. For example, and without limitation, history component 116 may log the countries of origin of received email messages, the countries to which outgoing emails are sent, the languages of received emails, and the languages in outgoing emails. History component 116 may further track information about received emails when the account user deletes the email without reading the email, manually marks the email as "junk" or spam, opens the email, responds to the email, and other user-initiated behavior regarding email messages. History component 116 may store a log of this information as profile 118 to develop a behavior profile for the account user that may be used by spam filter 110 to further refine spam detection. History component 116 may generate statistics about an account user's email behavior. For example, history component 116 may calculate a country frequency indicating that 95% of received email messages in one email account are from Germany, or a language frequency indicating that the account user writes 60% of emails in English and 40% in French.

System 100 may include a plurality of client devices, such as client device 120. Client device 120 may include any electronic device capable of communicating with email server 102 to send, receive and manage email messages in an email account. Client device 120 may respond to user directives received through various input devices, e.g. a keyboard, touch screen, a mouse, a stylus, a voice response system, and so forth. User directives may cause client device 120 to, for example, launch email client 122, select an email, delete an email, generate a new email message and add text to the email message, and so forth.

Email client 122 may be a software application comprising instructions that, when executed by client device 120, provide an interface for viewing, composing, and managing email messages. Email client 122 may connect to email server 102 to download new messages and to send messages composed on client device 120. Email client 122 may be a stand-alone application, such as, e.g. MICROSOFT OUTLOOK® from MICROSOFT CORPORATION®. Email client 122 may be a web client that accesses email server 102 through a web browser application such as EXPLORER® from MICROSOFT CORPORATION®.

Figure 2:
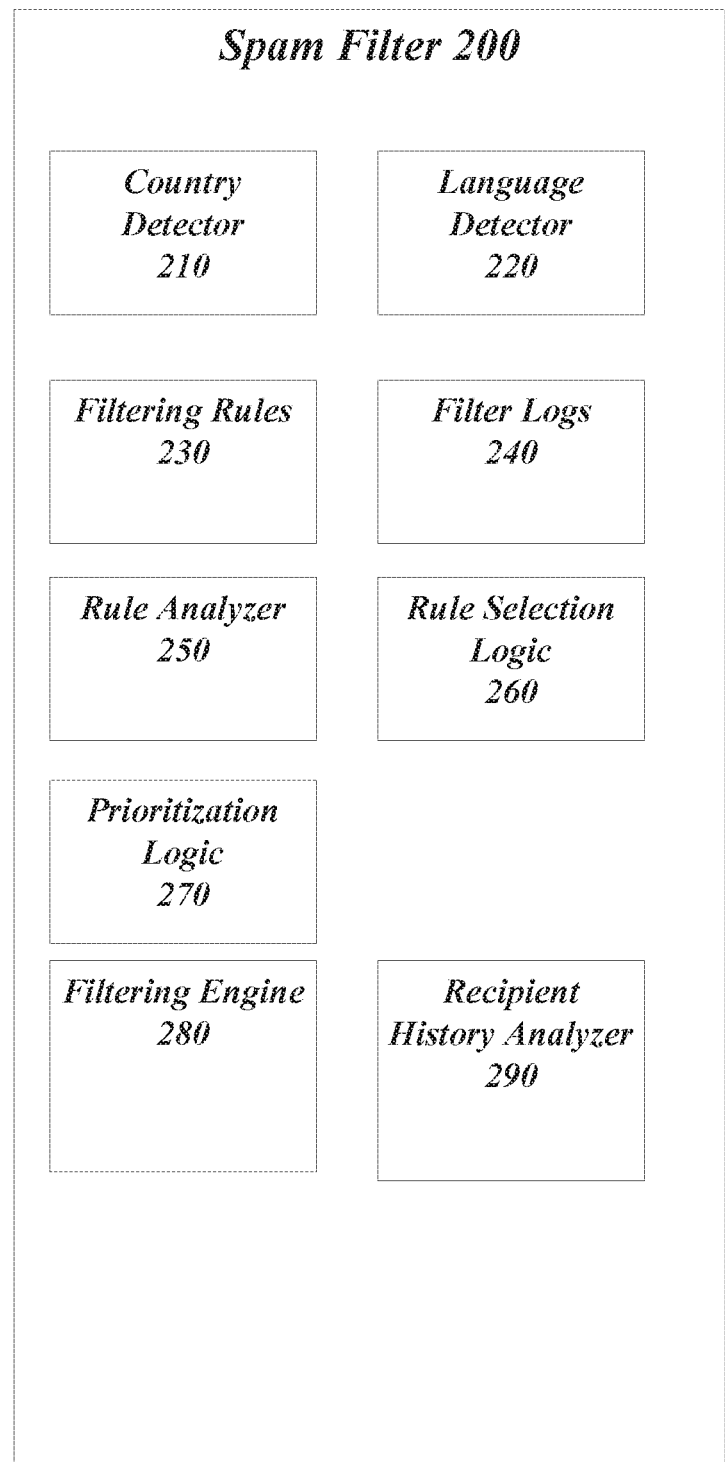
FIG. 2 illustrates an embodiment of a spam filter.

FIG. 2 illustrates an embodiment of spam filter 200. Spam filter 200 may be a representation of spam filter 110. Spam filter 200 may be a component of email server 102, for example. Spam filter 200 may be a stand-alone application or functional unit that may be invoked or called by an email server or email client to provide spam filtering services.

Although spam filter 200 shown in FIG. 2 has a limited number of elements in a certain topology, it may be appreciated that spam filter 200 may include more or fewer elements in alternate topologies as desired for a given implementation. Spam filter 200 may include various functional components, such as rule analyzer 250, rule selection logic 260, prioritization logic 270, filtering engine 280, and recipient history analyzer 290. Spam filter 200 may include alternate, fewer or additional components to provide the functionality described herein. In various embodiments, some components may be combined into one component. The embodiments are not limited to these examples.

In various embodiments, spam filter 200 may optionally include country detector 210 and/or language detector 220. In particular, spam filter 200 may include one or both of these components when an email server using spam filter 200 does not have country and/or language detectors, or does not make their results available to spam filter 200. Country detector 210 and language detector 220 may operate similarly to country detector 112 and language detector 114, respectively.

Spam filter 200 may include a set of filtering rules 230. Filtering rules 230 may be stored in a storage medium accessible to spam filter 200. Filtering rules 230 may be a set of logical constructs that can be applied to information about an email message to determine whether the message is spam or not. A filtering rule 230 may, for example, assign a weight or score to an email message according to how the email message fits the rule. For example, suppose a filtering rule includes a list of words that tend to indicate spam, such as names of pharmaceuticals, profanity, or sexual terms. The rule may specify that if an email includes a word from the list, a score may be assigned, for example, to a weighted cumulative sum. If several words from the list appear in the email, the score may increase. If the score reaches a threshold value, the email message may be determined to be spam. Filtering rules are described further with respect to FIG. 3.

Spam filter 200 may include filter logs 240. Filter logs 240 may record information about the effectiveness and performance of a filtering rule. For example, filter logs 240 may record the amount of processing time needed to execute a filtering rule 230 and whether a rule contributed to a determination of spam.

Spam filter 200 may include a rule analyzer 250. Rule analyzer 250 may analyze the results of applying a rule and generate information about rule performance from information stored in filter logs 240. For example, rule analyzer 250 may calculate a measure of rule effectiveness. For example, rule analyzer 250 may calculate a statistic reflecting how often a rule resulted in a spam determination. Rule analyzer 250 may also assign a weight for a rule to increase or decrease the impact that applying the rule has on the final spam determination. The weight may be automatically generated, for example, based at least in part on the effectiveness measure. Rule analyzer 250 may operate in the background on the information in filter logs 240 to evaluate and re-evaluate the weights applied to a rule score.

Spam filter 200 may include rule selection logic 260. Rule selection logic 260 may examine the characteristics of an email message, profile information for the recipient, and/or statistics from rule analyzer 250 to select a subset of filtering rules 230 to apply to a specific email message. Rule selection logic 260 may select filtering rules to apply based on, for example, the language that the message is written in, the country of origin of the message, a category of the message, and/or information about the recipient's email patterns. For example, if the message is written in German, then filtering rules that are specific to any other languages may be excluded from the set, while selecting German-specific filtering rules. If the message is determined to be in a financial scam category, e.g. phishing, then rules about financial scam spam may selected to apply, while rules that apply to pharmaceutical spam may be excluded. Accordingly, potentially large numbers of filtering rules may be excluded from the set of rules to apply, while including a relatively small subset of rules, thereby reducing processing time and resources in making a spam determination. The embodiments are not limited to these examples.

Spam filter 200 may include prioritization logic 270. Prioritization logic 270 may examine information about the filtering rules, e.g. performance information, to determine which filtering rules may arrive at a spam determination most efficiently. For example, filtering rules that historically use lower processing time may be considered more efficient than filtering rules that use higher processing time. Additionally, the weights of the rules may be considered, alone or in combination with processing time. A rule that has a higher weight may be considered more efficient, or more effective, than rules with a lower weight. Additionally, the effectiveness of a rule in determining spam may be considered, alone or in combination with processing time and/or weight. High effectiveness may be considered more efficient or "better" than lower effectiveness. Prioritization logic 270 may prioritize the rules having the lowest processing time, highest weight and highest effectiveness above rules having higher processing time, lower weight and lower effectiveness. Prioritization may be performed dynamically, for example, whenever there is new data about the performance of the filtering rules. The embodiments are not limited to these examples.

Spam filter 200 may include a filtering engine 280. Filtering engine 280 may operate to evaluate an email message against filtering rules 230, assign a score, and determine whether the email message is spam or not. Filtering engine 280 may work with rule selection logic 260 and prioritization logic 270. For example, rule selection logic 260 and prioritization logic 270 may provide to filtering engine 280 a prioritized subset of rules to apply to a particular message.

In an embodiment, filtering engine 280 may accumulate the scores resulting from applying the filtering rules 230 on a message to generate a total spam determination measure. Each filtering rule 230 may generate its own score, which may be weighted according to how strongly the particular rule predicts spam. The total spam determination measure may take the form: $S=w_1s_1+w_2s_2+ \ldots w_ns_n$ where w represents a weight and s indicates the score from applying a rule from the prioritized subset of rules. In some embodiments, S may be compared to a threshold value after the application of each rule, and when S exceeds the threshold, the message may be determined to be spam and further rule application may cease.

Filtering engine 280 may work with recipient history analyzer 290 to evaluate an email message according to behavior or history-related filtering rules. Recipient history analyzer 290 may receive information from history component 116 about an email recipient's country and language activity. For example, suppose a filtering rule states that if the country of origin of a received email does not match the countries that the recipient communicates with, then assign a score that indicates a high probability of that the message is spam. Filtering engine 280 may request, from recipient history analyzer 290, the countries that the recipient communicates with. Recipient history analyzer 290 may request or retrieve that information from history component 116 and provide it to filtering engine 280.

In an embodiment, recipient history analyzer 290 may read logs generated by history component 116, e.g. profile 118, and perform its own statistical analysis of the profile data. In such an embodiment, history component 116 may perform fewer analytical functions and may, more simply, log the relevant data without analysis. Recipient history analyzer 290 may compile a profile or other statistical information about a particular account user's email-related behavior. As previously described, this may include determining the primary country or countries with which a user corresponds, the primary language(s) used in correspondence for the user, and so forth. The embodiments are not limited to these examples.

In determining a profile for a user, either history component 116 or recipient history analyzer 290 may update the profile periodically or continually. Newer behavior may affect the profile more than older behavior. For example, if a user had corresponded extensively in Russian for a time period of six months, but had then stopped corresponding in Russian for the following eight months, then Russian would no longer be considered to be a language of correspondence for the user.

Either history component 116 or recipient history analyzer 290 may keep track of a total number of emails sent and/or received by a specific user account within a recent time period, e.g. the past six months. From that total number, history component 116 or recipient history analyzer 290 may determine how many were sent in language A (e.g. English), language B (e.g. French), and so forth. The languages appearing in the highest percentages may be considered to be the user's commonly used languages, against which new emails may be analyzed. Similarly, history component 116 or recipient history analyzer 290 may determine how many emails were received from country A (e.g. the U.S.) and from country B (e.g. France). The countries of origin used, e.g. received from or sent to, in the largest number of emails may be considered to be the user's commonly "used" countries.

The determination of a commonly used country or language may be affected by factors in addition to frequency. For example, a language frequency for language C (e.g. Chinese) may be modified or weighted by how many times an email sent in language C is actually opened, or deleted without opening. For example, a high volume of emails received in Chinese could potentially cause Chinese to be considered one of the user's commonly used languages, unless the user never opens emails in Chinese and just deletes them. In such a case, Chinese would not be considered to be one of the user's commonly used languages. History component 116 or recipient history analyzer 290 may perform other analyses to generate a profile of an account beyond the examples provided herein.

Figure 3:
FIG. 3 illustrates an embodiment of filtering rules.

FIG. 3 illustrates an example of filtering rules 300 for the system 100. Filtering rules 300 may be one representative example of filtering rules 230. As shown in FIG. 3, filtering rules 300 may be organized into different types. For example, filtering rules 300 may include language rules 310, country of origin rules 320, category rules 330, and recipient rules 340. Within each type, the rules may be sub-divided into subtypes. Rule selection logic 260 may select the rules that are in one subtype and be able to exclude rules from one or more other subtypes. The embodiments are not limited to these examples.

Language rules 310 may include rules that are specific to a particular language. Subtypes of language rules 310 may include a subtype for each language, e.g. a subtype for Chinese language messages, and a subtype for German language messages. Rules that in the Chinese subtype may be irrelevant to messages written in other languages and may be excluded from non-Chinese messages. Language rules 310 may, for example, look for language-specific words or phrases, grammatical structures and so forth in determining whether a message is spam. Language rules 310 may, for example, be used to determine whether the language of a message corresponds to the country of origin of the message, or to a language that the recipient corresponds in frequently. The embodiments are not limited to these examples.

Country of origin rules 320 may include rules related to a specific country. Subtypes of country of origin rules 320 may include a subtype for each country, or for a grouping of countries, e.g. a subtype for Russia and a subtype for Thailand. The embodiments are not limited to these examples.

Category rules 330 may include rules specific to a category of messages. Subtypes of category rules may include a subtype for each category. Categories may be initially created by a human operator, or identified automatically from analyzed spam messages. Categories may include, for example, phishing, pharmacy, pornography, financial scams, seasonal, and so forth. A subtype of category rules 330 may be selected, for example, when analysis of daily spam trends identifies a high volume of spam of a certain category occurring in a general population of email messages. Some categories are primarily seasonal in nature, such as around certain holidays. Rules for such seasonal categories may be excluded from the subset at times outside of the relevant seasons. The embodiments are not limited to these examples.

Recipient rules 340 may include rules based on a particular recipient's behavior with respect to email. For example, based on a profile, e.g. profile 118, if a recipient generally corresponds with only one country, recipient rules 340 may cause country of origin rules 320 to be selected for just that country. Similarly, if a recipient normally corresponds in only one or a few languages, then language selection rules 310 may be selected for just those languages. Further, a recipient may be categorized in relation to the categories of spam, for example, an employee of a financial institution may be associated with the "financial" or "phishing" categories. Being associated with a category or categories may cause category rules 330 for that category to be selected whenever email for that recipient is received. The embodiments are not limited to these examples.

Each rule type may have statistics associated with it, e.g. language rules statistics 312, country of origin rules statistics 322, category rules statistics 332, and recipient rules statistics 342. The statistics may be stored or calculated from filter logs 240. The statistics may include such information as what percentage of a rule's application results in a positive spam determination, how much processing time on average a rule uses, and so forth. The statistics may be used, for example, by prioritization logic 370 to prioritize a set of rules. Additionally, rules that statistically contribute little to a spam determination may eventually be deleted or modified to be more effective.

Filtering rules 300 may include some rules that cause or trigger a rule selection and/or prioritization process. For example, when a message includes a specific term in a header, or is mapped to a dictionary based on a keyword in the body, a rule may cause a subset of rules to be selected and prioritized based on the term or dictionary mapping.

Figure 4:
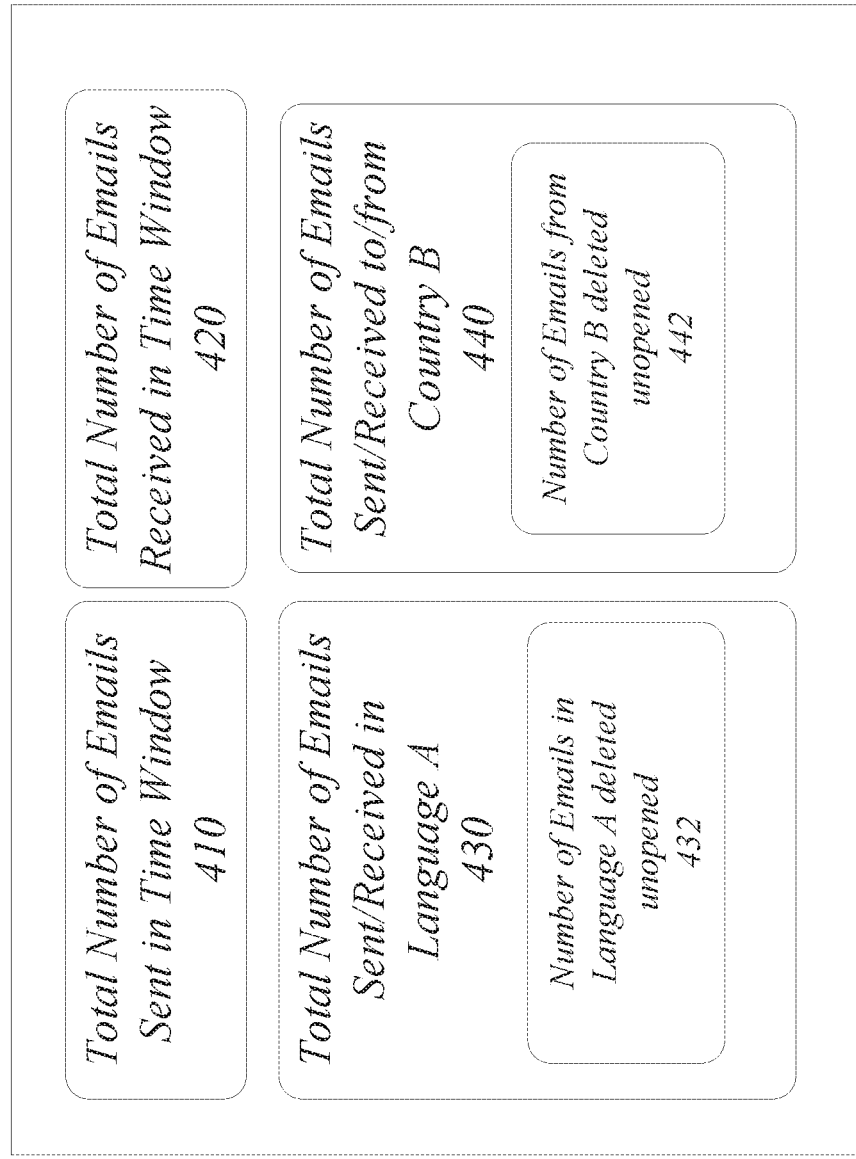
FIG. 4 illustrates an embodiment of a profile.

FIG. 4 illustrates an example of a profile 400. Profile 400 may be one representative example of profile 118. Profile 400 may be associated with one specific email account, and may reflect behavior of the account user with respect to email. For example, profile 400 may include a total number of emails sent in a time window (410) and a total number of emails received in the time window (420). The time window may be a time period that begins at some time in the past, e.g. 6 months ago, and includes time up to the present moment.

Profile 400 may also include a total count of email messages sent/received that are written in a specific language A (430). Profile 400 may include multiple counts 430, one for each language detected by language detector 114. Profile 400 may include further subsets of sent and received emails with respect to the specific language, for example, a number of emails in that language that were deleted without being opened (432). Other behaviors with respect to the language may be captured as well.

Profile 400 may also include counts of subsets of sent and received emails. For example, profile 400 may include a total count of email messages sent/received to/from a specific country B (440). Profile 400 may include multiple counts 440, one for each country detected by country detector 112. Profile 400 may include further subsets of sent and received emails with respect to the specific country, for example, a number of emails from that country that were deleted without being opened (442). Other behaviors with respect to the country may be captured as well.

Profile 400 may include information about the account user's behavior with respect to other characteristics of email. For example, profile 400 may include information (not shown) about categories of email that the account user may interact with.

In an embodiment, data older than the time window may be retained in profile 400 and may be used to calculate a frequency with which the account user communicates in a language or with a country. However, such older profile data may have less weight in such calculations than more current data.

Figure 5:
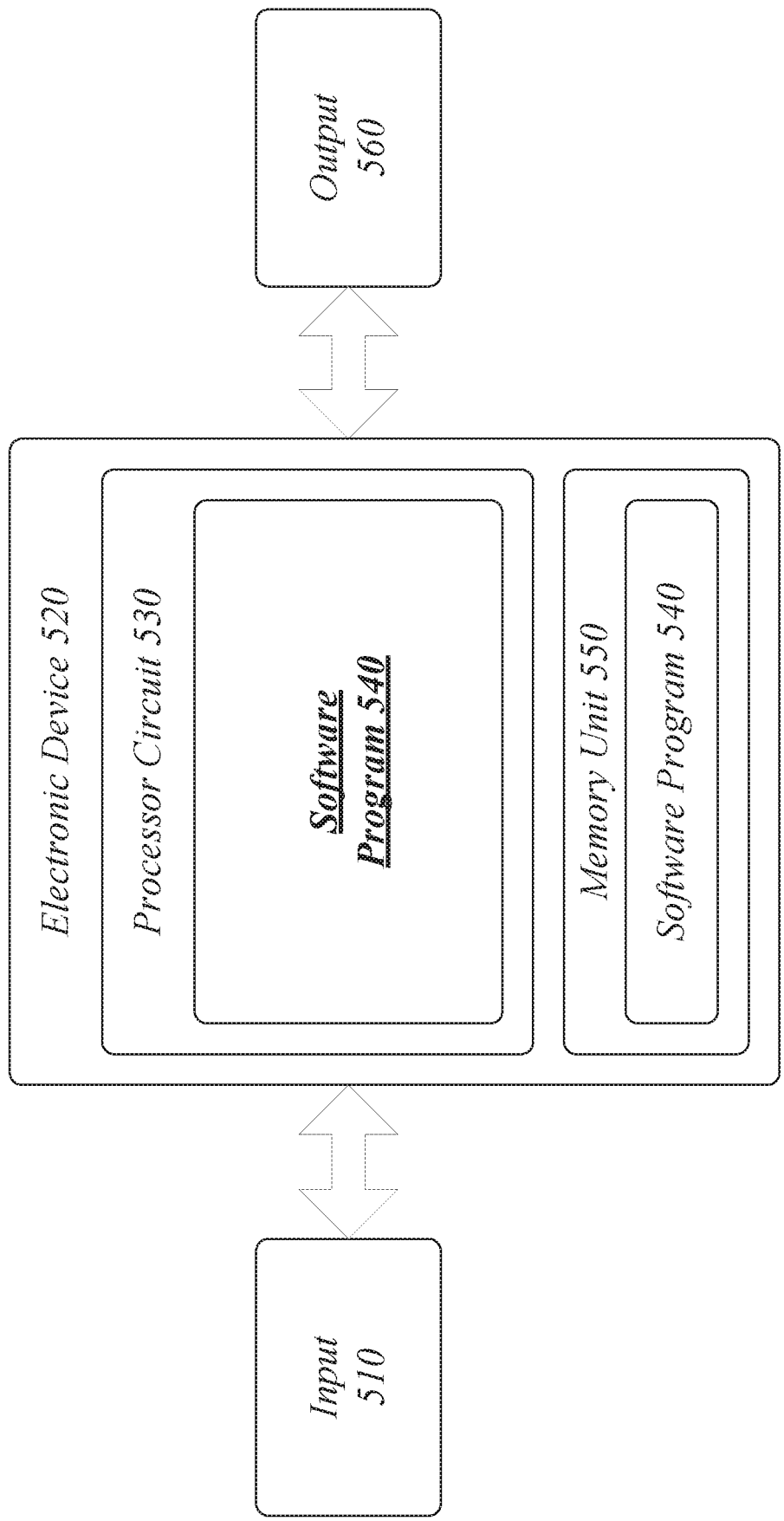
FIG. 5 illustrates an embodiment of a system to implement components of the system of FIG. 1.

FIG. 5 illustrates an embodiment of a system 500 for the system 100. In one embodiment, the system 500 may include an electronic device 510. Electronic device 510 may be a representative example of a client device 120. Electronic device 510 may be a representative of a device used to implement email server 102. Although system 500 shown in FIG. 5 has a limited number of elements in a certain topology, it may be appreciated that system 500 may include more or fewer elements in alternate topologies as desired for a given implementation.

Electronic device 510 may receive inputs 520, for example, user directives from an input device such as a keypad, stylus or fingertip. Inputs 520 may also include data and instructions received over a network, for example, from email server 102. Electronic device 510 may transmit outputs 570, for example, requests to connect to email server 102, email messages, and so forth.

Electronic device 510 may include a processor circuit 530 and a memory unit 550. Processor circuit 530 may be a processing unit or component as described in greater detail below. Memory unit 550 may be, for example, a system memory or other memory device capable of storing instructions and/or data for short term or long term storage.

Electronic device 510 may include a software program 540. In an embodiment, instructions for software program 540 may be stored in memory unit 550. Software program 540 may be executed on processor circuit 530 to provide some functionality on electronic device 510. For example, software program 540 may provide email client 122. The embodiments are not limited to these examples.

When electronic device 510 is used to implement a server such as email server 102, multiple software programs 540 may provide email server operations, spam filtering operations, history component operations and so forth. The embodiments are not limited to these examples.

Figure 6:
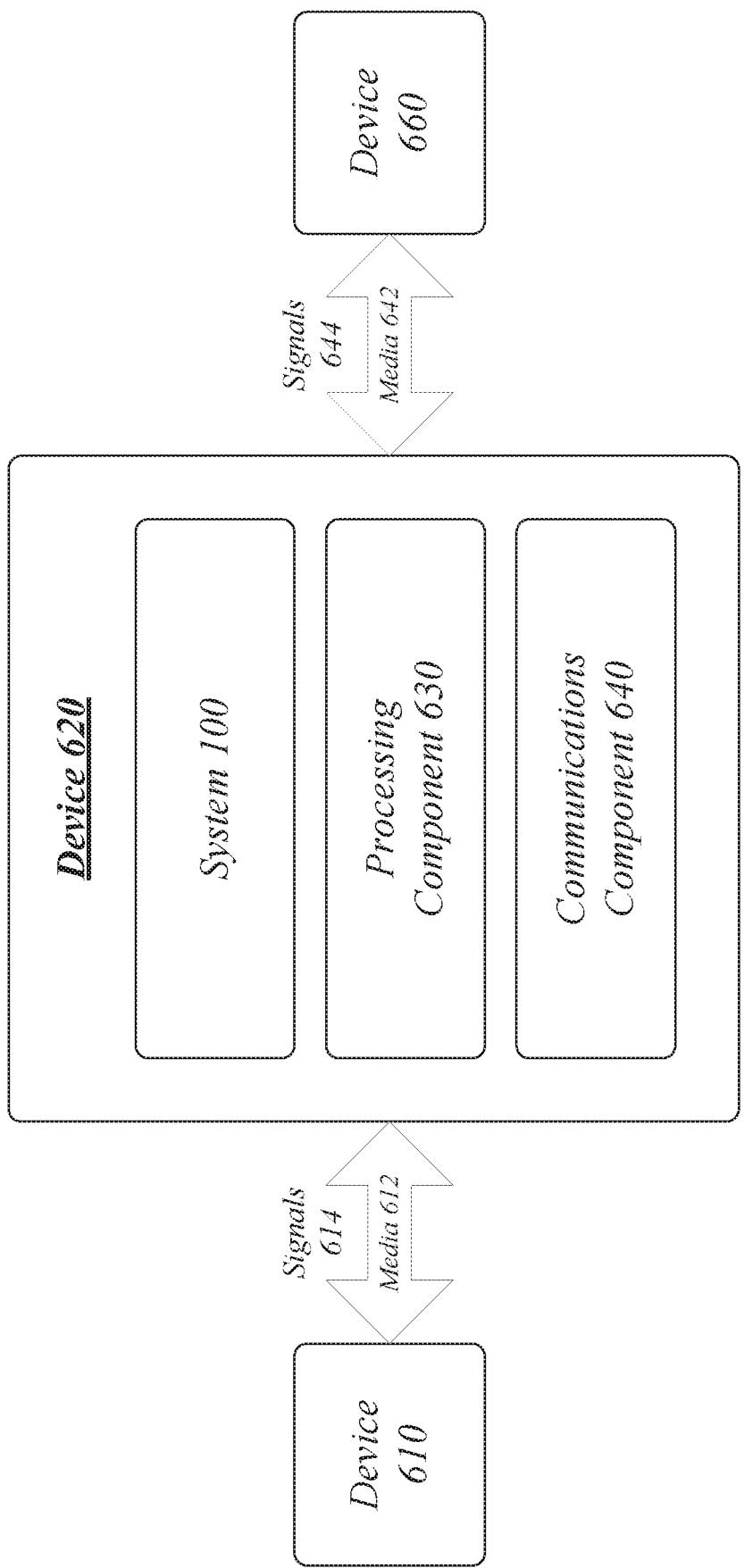
FIG. 6 illustrates an embodiment of a centralized system for the system of FIG. 1.

FIG. 6 illustrates a block diagram of a centralized system 600. The centralized system 600 may implement some or all of the structure and/or operations for the system 100 in a single computing entity, such as entirely within a single device 620.

The device 620 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 620 may execute processing operations or logic for the system 100 using a processing component 630. The processing component 630 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 620 may execute communications operations or logic for the system 100 using communications component 640. The communications component 640 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 640 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 612, 642 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 620 may communicate with other devices 610, 650 over a communications media 612, 642, respectively, using communications signals 614, 644, respectively, via the communications component 640. The devices 610, 650 may be internal or external to the device 620 as desired for a given implementation.

In an embodiment, device 620 may represent a device that sends and receives emails, performs spam filtering and on which a user can access and manage an email account without having to connect with a separate device. Alternatively, device 620 may represent a client device that performs spam filtering on the client rather than at the email server servicing the account. The embodiments are not limited to these examples.

Figure 7:
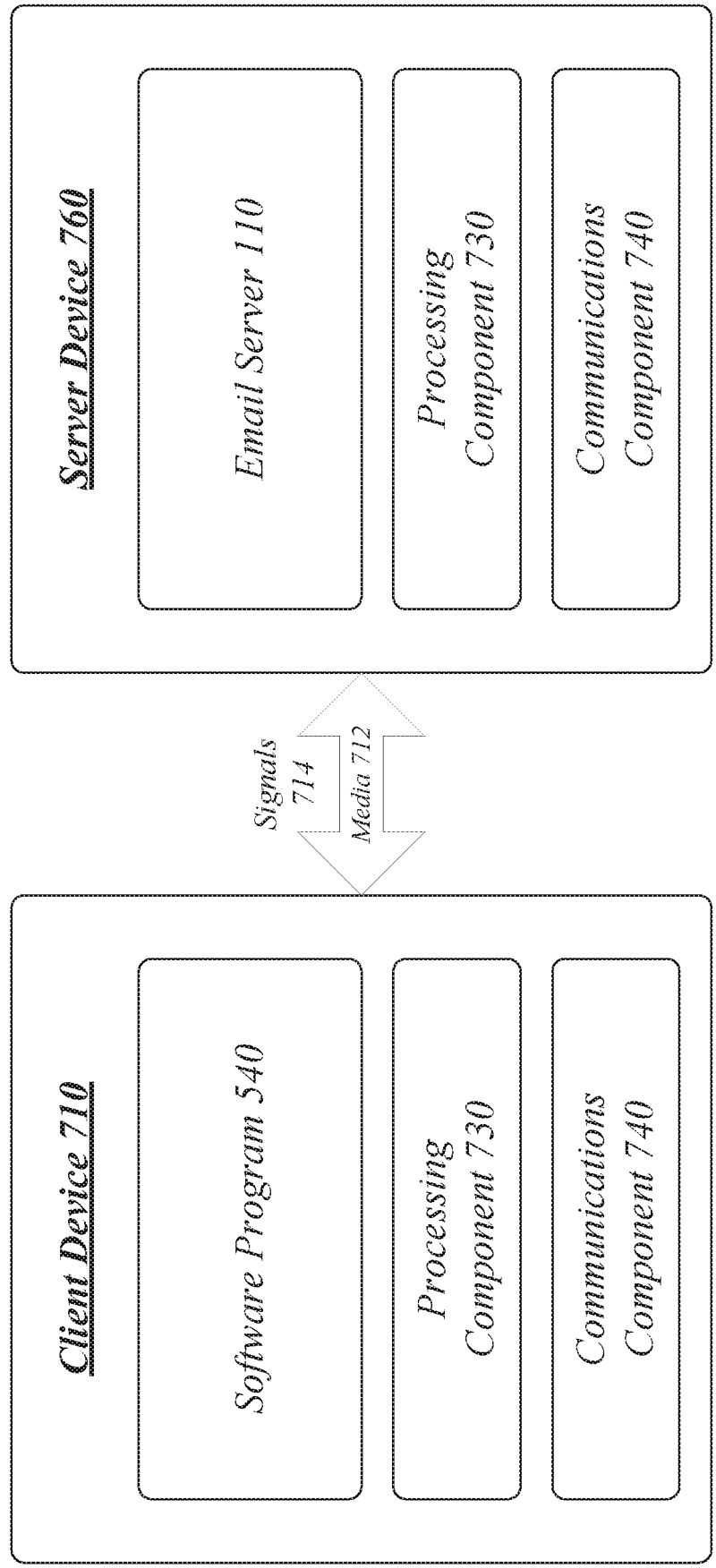
FIG. 7 illustrates an embodiment of a distributed system for the system of FIG. 1.

FIG. 7 illustrates a block diagram of a distributed system 700. The distributed system 700 may distribute portions of the structure and/or operations for the system 100 across multiple computing entities. Examples of distributed system 700 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 700 may comprise a client device 710 and a server device 750. In general, the client device 710 and the server device 750 may be the same or similar to the device 620 as described with reference to FIG. 6. For instance, the client system 710 and the server system 750 may each comprise a processing component 730 and a communications component 740 which are the same or similar to the processing circuit 630 and the communications component 640, respectively, as described with reference to FIG. 6. In another example, the devices 710, 750 may communicate over a communications media 712 using communications signals 714 via the communications components 740.

The client device 710 may comprise or employ one or more client programs that operate to perform various methodologies in accordance with the described embodiments. In one embodiment, for example, the client device 710 may implement software program 540, e.g. an email client program.

The server device 750 may comprise or employ one or more server programs that operate to perform various methodologies in accordance with the described embodiments. In one embodiment, for example, the server device 750 may implement email server 102 and/or its components as shown in FIG. 1.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be needed for a novel implementation.

FIG. 8 illustrates one embodiment of a logic flow 800. Logic flow 800 may be representative of some or all of the operations executed by one or more embodiments described herein. The operations of logic flow 800 may be executed, for example, by email server 102, spam filter 110, 200, or a combination thereof.

In the illustrated embodiment shown in FIG. 8, logic flow 800 may receive an email message for a recipient at block 802. For example, mail services component 108 may receive an email message addressed to the recipient.

Logic flow 800 may extract email characteristics from the message at block 804. For example, mail component 108, country detector 112, 210, language detector 114, 220, and/or spam filter 110, 200 may extract such characteristics as: language, country of origin, message size, time of day, recipient, category and so forth. The email characteristics may be provided to rule selection logic 260 and filtering engine 280.

In some embodiments, one or more filtering rules may exist that, when successfully applied to one or more email characteristics, cause the remainder of logic flow 800 to occur. For example, if extracted email characteristics include specific terms in a header or body of the message, the existence of those specific terms may cause a rule selection process to begin. This may allow a user or administrator to create more tailored and/or aggressive message filtering rather than relying solely on rule selection that is driven from the statistical data.

Logic flow 800 may retrieve global filtering rule statistics at block 806. For example, rule analyzer 250, rule selection logic 260, and/or prioritization logic 270 may retrieve rule statistics, e.g. rule statistics 312, 322, 332, 342, from filter logs 240. In an embodiment, retrieving global filtering rule statistics may include calculating statistics from data in filter logs 240.

Logic flow 800 may retrieve a recipient profile at block 808. For example, rule selection logic 260 and/or filtering engine 280 may retrieve profile 118, 400 for the intended recipient of the received message.

Logic flow 800 may select a subset of filtering rules at block 810. For example, rule selection logic 260 may select rules according to the email characteristics, global filtering rule statistics and/or recipient profile. For example, email characteristics of language and country of origin may cause rule selection logic 260 to select language rules 310 and country of origin rules 320 specific to the language and country of origin of the message. The embodiments are not limited to this example.

Global filtering rules statistics may cause rule selection logic 260 to select the "best" filtering rules, e.g. those that have large effectiveness to processing time ratios, or large weight to processing time ratios. In some embodiments, global filtering rules statistics may be used to select from all filtering rules 230, or from within a previously selected subset, such as the selected language rules or country of origin rules. The embodiments are not limited to this example.

The contents of a recipient profile may cause rule selection logic 260 to select category rules 330 for a category associated with the recipient, and/or rules that check a recipient's patterns of email use, e.g. languages used, countries corresponded with, categories of mail deleted without reading, and so forth. The embodiments are not limited to this example.

By extension, the email characteristics, global filtering rule statistics and/or recipient profile may be used to exclude filtering rules that are not applicable to the message. For example, rules that apply to a language that is not used in the email may be excluded from application, or rules that apply to a seasonal category when the message is received out of season. The embodiments are not limited to this example.

Logic flow 800 may prioritize the subset of rules at block 812. For example, rule selection logic 260 may provide the subset of rules to prioritization logic 270. Prioritization logic 270 may use the global filtering rules statistics to prioritize the subset of rules from highest to lowest priority according to the statistics. A rule that is highly effective and that needs low processing time may be assigned a higher priority compared to less effective rules that need a comparable processing time, and may be assigned a higher priority compared to comparably effective rules that need a more processing time, for example. In some embodiments, higher priority rules may be applied to a message before lower priority rules. The embodiments are not limited to this example.

Logic flow 800 may apply the prioritized subset of rules to the message at block 814. For example, filtering engine 280 may received the prioritized subset form prioritization logic 270 and may apply the rules in order from highest to lowest priority until a determination of whether the message is spam is reached. Block 814 is described further with respect to FIG. 9. The embodiments are not limited to this example.

Figure 9:
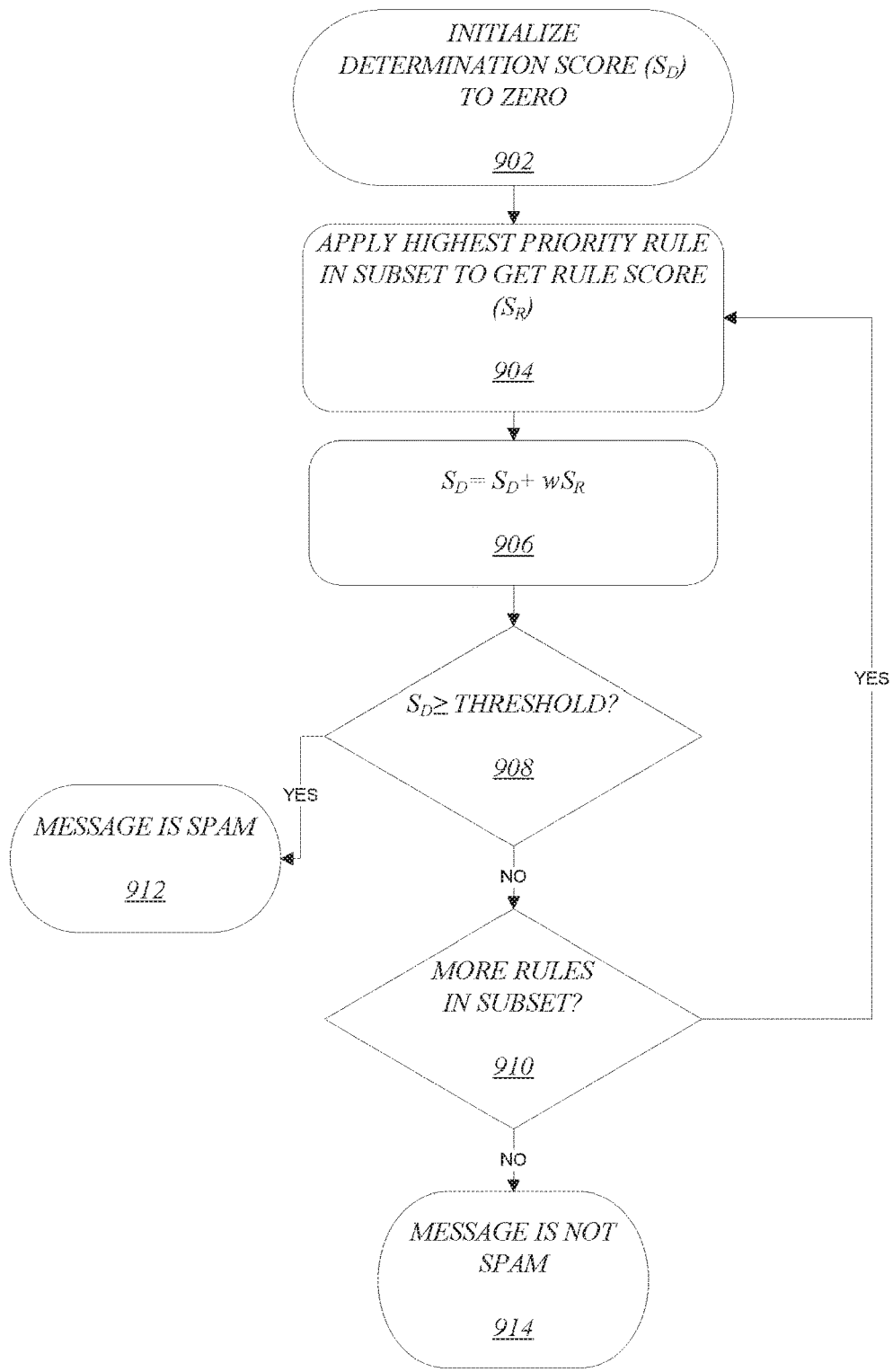
FIG. 9 illustrates an embodiment of a logic flow for the system of FIG. 1.

FIG. 9 illustrates one embodiment of a logic flow 900. Logic flow 900 may be representative of some or all of the operations executed by one or more embodiments described herein. In particular, logic flow 900 may be a representative example of block 814 from FIG. 8.

In the illustrated embodiment shown in FIG. 9, logic flow 900 may initialize a determination score at block 902. For example, filtering engine 280 may initialize a variable $S_D$ to zero, or some other initial value.

Logic flow 900 may apply the highest priority rule in the subset of rules at block 904 to get a rule score $S_R$. For example, filtering engine 280 may apply a rule to the message. One example of a rule may be that if the message is in a language that is not used in the country of origin, assign a score of a specific value, e.g. 0.4, or 20, otherwise, assign a score of zero (0).

Logic flow 900 may add the rule score to the determination score at block 906. In an embodiment, a rule score may also have a weight assigned to it. When the rule score is weighted, the weighted rule score may be added to the determination score.

Logic flow 900 may check if the determination score is greater than or equal to a threshold value at block 908. For example, filtering engine 280 may compare the two values. When the determination score is greater than or equal to the threshold value, logic flow 900 ends at block 912, where the message is determined to be spam. No further rules are applied.

Logic flow 900 may check if there are remaining rules to apply in the subset at block 910 when the determination score is less than the threshold value. When there are additional rules to apply, logic flow 900 repeats beginning at block 904.

When there are no more rules in the subset to apply at block 910, logic flow 900 ends at block 9914 where the message is determined not to be spam. The embodiments are not limited to this example.

Figure 10:
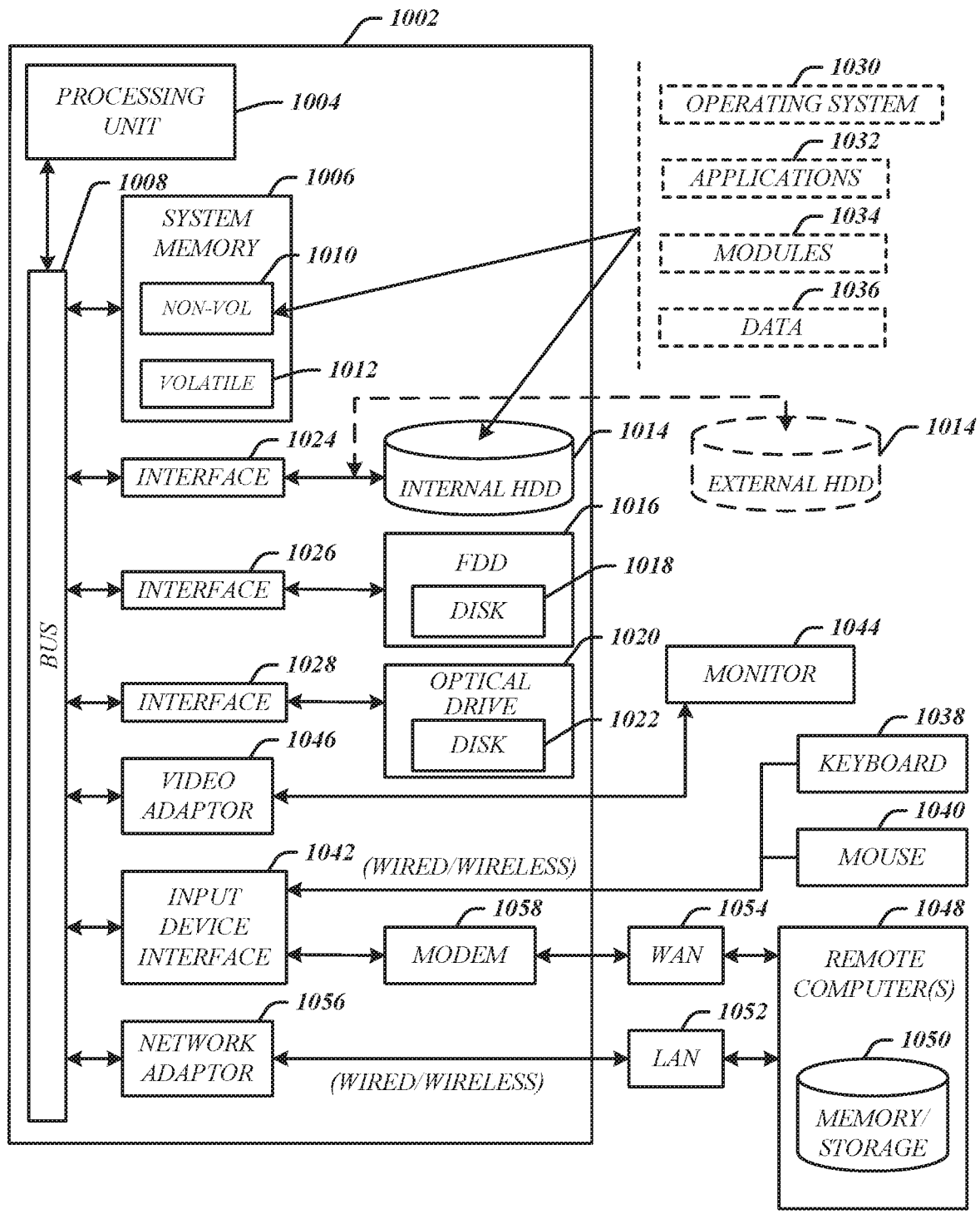
FIG. 10 illustrates an embodiment of a computing architecture.

FIG. 10 illustrates an embodiment of an exemplary computing architecture 1000 suitable for implementing various embodiments as previously described. In one embodiment, the computing architecture 1000 may comprise or be implemented as part of an electronic device. Examples of an electronic device may include those described with reference to FIG. 5, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the system 100.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
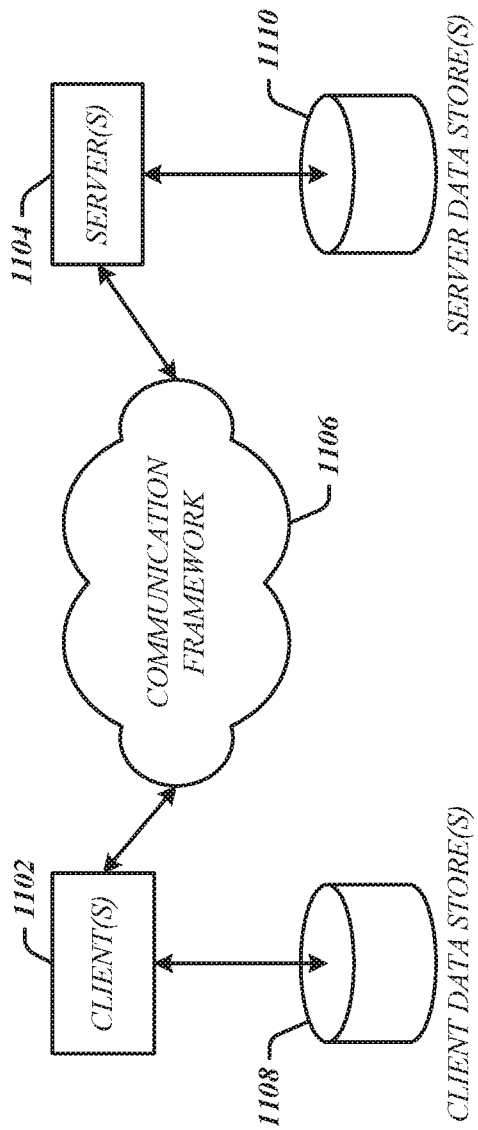
FIG. 11 illustrates an embodiment of a communications architecture.

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 comprises includes one or more clients 1102 and servers 1104. The clients 1102 may implement the client device 910. The servers 1104 may implement the server device 950. The clients 1102 and the servers 1104 are operatively connected to one or more respective client data stores 1108 and server data stores 1110 that can be employed to store information local to the respective clients 1102 and servers 1104, such as cookies and/or associated contextual information.

The clients 1102 and the servers 1104 may communicate information between each other using a communication framework 1106. The communications framework 1106 may implement any well-known communications techniques and protocols. The communications framework 1106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1106 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth needed by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a logic circuit; and
a memory for storing executable instructions, that when executed by the logic circuit cause the apparatus to:
receive email characteristics of a received email message;
retrieve system-wide filtering rule statistics;
retrieve a recipient profile for an intended recipient of the message, wherein the recipient profile comprises a country with which the recipient communicates by email and a language with which the recipient communicates by email;
select a subset of rules from a set of filtering rules according to the email characteristics, the system-wide filtering rule statistics, and the recipient profile;
prioritize the subset of rules according to the system-wide filtering rule statistics; and
apply the prioritized subset of rules to the message until a determination of whether the message is spam is made.

2. The apparatus of claim 1, wherein the instructions further comprise prioritization logic, that when executed by the logic circuit cause the apparatus to:
prioritize the subset of rules according to the system-wide filtering rule statistics comprising at least one of:
a processing time of a rule;
a weight of a rule;
a score of a rule; or
an effectiveness of a rule.

3. The apparatus of claim 2, wherein the prioritization logic is configured to assign a higher priority to a rule having a lower processing time, a higher weight, and a higher effectiveness relative to other filtering rules in the subset of rules.

4. The apparatus of claim 1, wherein the instructions when executed by the logic circuit further cause the apparatus to:
determine a score for a rule when the rule is applied to the message;
accumulate the scores from the applying of the subset of rules to the message into a determination score; and
compare the determination score to a threshold value to make the determination of whether the message is spam.

5. The apparatus of claim 1, the email characteristics comprising at least one of a language, a country of origin, a message size, a time of day, a recipient, or a category.

6. The apparatus of claim 5, the recipient profile comprising a category associated with the recipient.

7. The apparatus of claim 1, wherein the filtering rules comprise a plurality of rule types and subtypes, wherein the subset of rules is selected according to subtypes that are relevant to at least one of the email characteristics, the system-wide filtering rule statistics, or the recipient profile.

8. A computer-implemented method, comprising:
receiving an email message for a recipient at an email server;
extracting email characteristics from the received email;
retrieving filtering rule statistics;
retrieving a recipient profile for the recipient, wherein the recipient profile comprises a country of origin with which the recipient communicates by email and a language preference with which the recipient communicates by email;
selecting a subset of rules from a set of filtering rules according to the email characteristics, the filtering rule statistics, and the recipient characteristics;
prioritizing the subset of rules by assigning a higher priority to a filtering rule based upon information relative to other filtering rules in the set of filtering rules; and
applying the prioritized subset of rules from highest priority to lowest priority until a determination of whether the message is spam is reached.

9. The computer-implemented method of claim 8, further comprising:
determining a score for a rule when the rule is applied to the message;
accumulating the scores from the applying of the subset of rules to the message into a determination score;
comparing the determination score to a threshold value after each score determination to make the determination of whether the message is spam; and
stopping the application of the subset of rules when a determination is reached that the message is spam.

10. The computer-implemented method of claim 8, wherein the global filtering rule statistics comprise at least one of: a processing time of a rule; a weight of a rule; a score of a rule; or an effectiveness of a rule; and comprising: assigning a higher priority to a rule having a lower processing time, a higher weight, and a higher effectiveness relative to other filtering rules in the subset of rules.

11. The computer-implemented method of claim 8, wherein the filtering rules comprise a plurality of rule types and subtypes, and the computer-implemented method further comprising: selecting the subset of rules according to subtypes that are relevant to at least one of the email characteristics, the filtering rule statistics, or the recipient profile.

12. The computer-implemented method of claim 11, wherein the plurality of rule types comprise at least a languages rule type, a country of origin rule type, a category rule type, and a recipient rule type, wherein a filtering rule is associated with at least one type.

13. The computer-implemented method of claim 8, further comprising applying a rule by evaluating a regular expression against a string of text in the message.

14. The computer-implemented method of claim 8, the email characteristics comprising at least one of a language, a country of origin, a message size, a time of day, a recipient, or a category.

15. At least one non-transitory computer-readable storage medium comprising instructions that, when executed by a processor, cause a system to:

extract email characteristics from a received email message;
retrieve system-wide spam rule statistics;
retrieve a recipient profile for an intended recipient of the message, wherein the recipient profile comprises at least one of a country frequency with which the recipient communicates with a country of origin by email and a language frequency with which the recipient communicates in a language by email;
prioritize a set of filtering rules according to the email characteristics, the system-wide spam rule statistics, the recipient profile;
assign a higher priority to a filtering rule based upon at least one of a processing time, a weight, or an effectiveness relative to other filtering rules in the set of filtering rules; and
apply the prioritized set of rules sequentially to the message from highest priority to lowest, until a determination of whether the message is spam is made.

16. The non-transitory computer-readable storage medium of claim 15, comprising instructions that when executed cause the system to:
select a subset of rules from the prioritized set of rules according to at least one of the email characteristics, the global spam rule statistics, or the recipient characteristics; and
apply the prioritized subset of rules to the email.

17. The non-transitory computer-readable storage medium of claim 16, wherein the filtering rules comprise a plurality of types and subtypes, the medium comprising instructions that when executed cause the system to:
select the subset of rules according to subtypes that are relevant to at least one of the email characteristics, the system-wide spam rule statistics, or the recipient profile.

18. The non-transitory computer-readable storage medium of claim 15, comprising instructions that when executed cause the system to:
determine a score for a rule when the rule is applied to the message;
accumulate the scores from the applying of the subset of rules to the message into a determination score; and
compare the determination score to a threshold value to make the determination of whether the message is spam.

19. The non-transitory computer-readable storage medium of claim 18, comprising instructions that when executed cause the system to:
stop the application of the subset of rules when the determination score exceeds the threshold.

20. The non-transitory computer-readable storage medium of claim 15, wherein the system-wide spam rule statistics comprise at least one of: a processing time of a rule; a weight of a rule; a score of a rule; or an effectiveness of a rule.

* * * * *